United States Patent
Varney et al.

(12) 
(10) Patent No.: US 6,376,950 B1
(45) Date of Patent: Apr. 23, 2002

(54) COMBINED BEARING PLATE AND STATOR FRAME CASTING

(75) Inventors: James Varney, North Huntingdon; Walter E. Goettel, Monogahela; Ronald Shaffer, Pittsburgh; Brian L. Cunkelman, Blairsville, all of PA (US), (73) Assignee: Westinghouse Air Brake Technologies Corporation

( * ) Notice: Subject to any disclaimer, the term of this patent is extended or adjusted under 35 U.S.C. 154(b) by 0 days.

(21) Appl. No.: 09/636,357

(22) Filed: Aug. 11, 2000

(51) Int. Cl.[7] .............................. H02K 5/15; H02K 5/06
(52) U.S. Cl. ..................... 310/89; 310/91; 417/423.14
(58) Field of Search ................ 310/89, 90; 417/423.12, 417/423.7, 423.14, 423.1

(56) References Cited

U.S. PATENT DOCUMENTS 3,112,706 A * 12/1963 Ekey ...................... 417/423.12
3,280,751 A * 10/1966 Ekey ........................... 310/254
3,635,579 A * 1/1972 Wood ..................... 417/423.12

* cited by examiner

*Primary Examiner*—Burton S. Mullins
(74) *Attorney, Agent, or Firm*—James Ray & Associates (57) ABSTRACT

A combined bearing plate and stator frame for an air compressor powered by an electric motor. The air compressor includes a crankshaft rotationally supported by a rotational bearing, and the electric motor includes a rotor and a stator substantially surrounding the rotor. The rotor is mounted on a portion of the crankshaft for rotation therewith. The combined bearing plate and stator frame is adapted for integration into the air compressor so as to provide a bearing plate for mounting of the rotational bearing and a stator frame for mounting of the stator therein and an aligning the stator with the rotor mounted on the portion of the crankshaft. The combined bearing plate and stator frame includes a bearing plate member and a stator frame member, the bearing plate member and the stator frame member being integrally formed from a single piece of material.

15 Claims, 7 Drawing Sheets

COMBINED BEARING PLATE AND STATOR FRAME CASTING

CROSS-REFERENCE TO RELATED APPLICATIONS

This application is related to the following applications for U.S. patents, each of which has the same filing date as the present application: "Endplate for Use with Outboard Bearing Designs", filed by Walter Goettel, Roger Drummond, Ronald Shaffer, James Varney and Brian Cunkelman, U.S. Ser. No. 09/636,641, and "Shaft Extension for Use with Outboard Bearing Designs", filed by Walter Goettel, Roger Drummond, Ronald Shaffer, James Varney and Brian Cunkelman, U.S. Ser. No. 09/638,085. Additionally, the present application is directed to similar subject matter as is disclosed in U.S. Ser. No. 09/593,558, entitled "Locomotive Air Compressor with an Electric Motor Supported by an External Bearing", and as is disclosed in U.S. Ser. No. 09/593,559, entitled "Locomotive Air Compressor with Motor Supported by Outside Bearing". Each of the U.S. patent applications identified above is hereby expressly incorporated by reference into the present application, with the same effect as if each of the above-identified U.S. patent applications were fully set forth herein.

FIELD OF THE INVENTION

The present invention relates, in general, to an air compressor that is powered by an electrical motor.

More particularly, the present invention relates to an air compressor, driven by an electrical motor, which is used to supply compressed air to the air brake system of a railed vehicle (e.g., a train or light rail vehicle).

Even more particularly, the present invention relates to the relationship between the bearing plate of the air compressor and the stator frame of the electric motor. As is discussed more fully below, the bearing plate of the air compressor and the stator frame of the bearing plate should have a particular spatial alignment to one another, in order to ensure a relatively long and trouble free service operation of the combined air compressor and electric motor.

BACKGROUND OF THE INVENTION

The following background information is provided to assist the reader to understand the invention described and claimed herein. Accordingly, any terms used herein are not intended to be limited to any particular narrow interpretation unless specifically so indicated.

The use of an air compressor to supply compressed air for the operation of an air brake system is well known. In a railed vehicle, the air compressor is typically located in the locomotive of the train, etc. Earlier air compressors for trains were often powered via a power takeoff linkage from the engine of the locomotive. More modern diesel locomotives typically employ electric motors to supply tractive power, with the electrical power being generated onboard. The air compressors of diesel locomotives are, therefore, typically driven by electrical power, which is readily available onboard.

Figure 1:
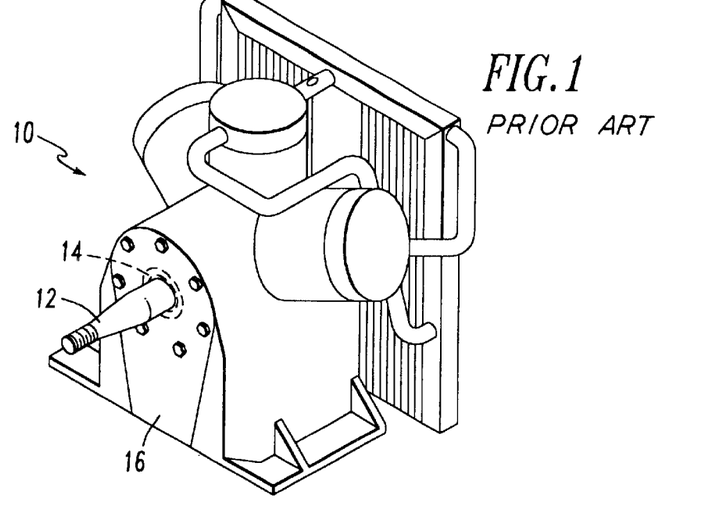
FIG. 1 is a simplified isometric view of a "3-CD" type air compressor, of the type described herein.

A main compressed air reservoir is normally employed. The main reservoir supplies compressed air to the "brake pipe," which runs the length of the train. The electric motor that drives the air compressor is typically started and stopped on an "as needed" basis, so as to maintain the compressed air pressure in the main reservoir within determined limits. Thus, the electric motor may be started and stopped repeatedly over the service life of the unit. FIG. 1 is a simplified isometric view of an air compressor unit that is widely employed within the railroad industry for supplying compressed air for use in air braking systems, namely, a "3-CD" Air Compressor manufactured by the Westinghouse Air Brake Company® division of Wabtec Corporation® (1001 Air Brake Avenue, Wilmerding, Pa.). Particulars of the "3-CD" Air Compressor are set forth in the pamphlet entitled "Instructions for Disassembly, Repair and Assembly of '3-CD' Air Compressors," published by the above-identified Westinghouse Air Brake Company® (copyright 1994), this document being hereby expressly incorporated by reference into the present application, with the same effect as if fully set forth herein.

In FIG. 1, a "3-CD" air compressor is generally indicated by reference numeral 10. The air compressor 10 includes a crankshaft 12, which is driven by an external power source and which, in turn, drives the internal compression parts of the air compressor 10 (e.g., pistons, valves, etc.). The crankshaft 12 is rotationally supported and positioned by typically two inboard rotational bearings, one such inboard bearing 14 being shown in phantom in FIG. 1. The inboard bearing 14 is supported and positioned by a generally key-shaped bearing plate 16, which also serves to close a portion of the crankcase of the air compressor 10. It will be seen that the crankshaft 12 projects outward from and beyond the bearing plate 16.

Figure 2:
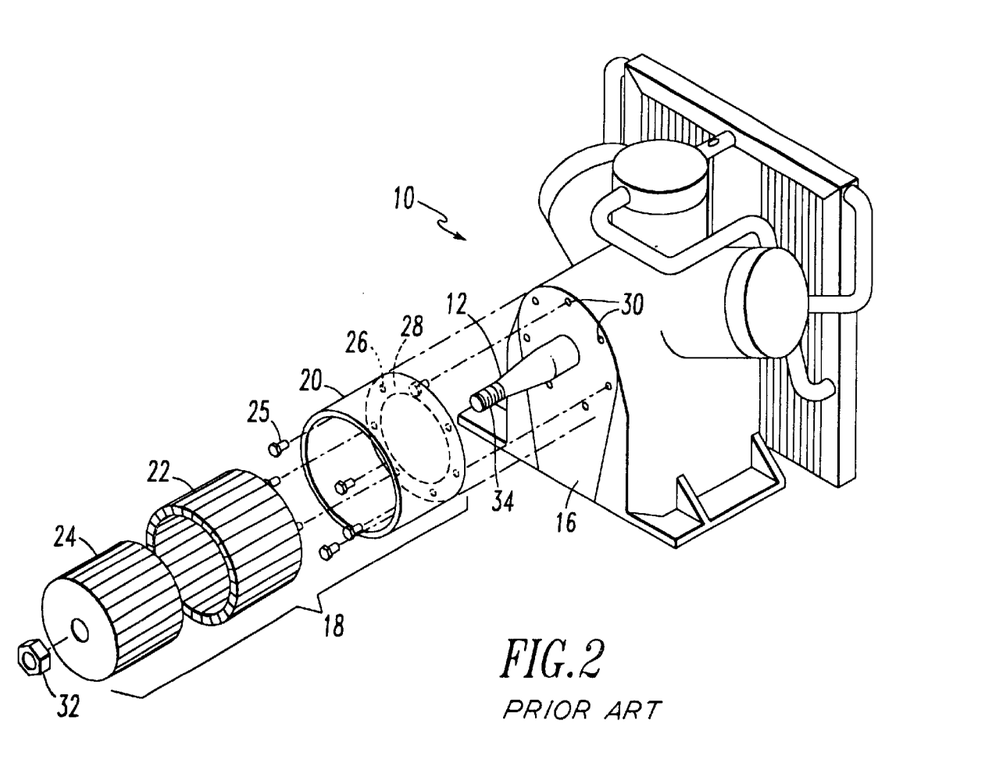
FIG. 2 is an isometric exploded view of a "3-CD" type air compressor equipped with an electric motor according to practices heretofore employed in the industry.

FIG. 2 illustrates the manner in which an electric motor, generally indicated by reference numeral 18, has heretofore been mated with the air compressor 10, in order to provide power to the air compressor 10. The electric motor generally includes a stator frame 20, a stator 22, and a rotor 24. The stator frame 20 has, in the past, been connected to the exposed face of the bearing plate 16 by bolts 25 which pass through holes 26 provided in an inwardly projecting lip 28 provided on the rearward face of the stator frame 20. The bolts then engage a series of threaded blind holes 30 provided in the outwardly exposed face of the bearing plate 16. The stator frame is therefore "cantilevered" from the exposed face of the bearing plate 16 and secured in this position by the bolts.

The stator frame 20 may be viewed as the "housing" of the electric motor 18, serving to enclose the stationary stator 22 and the rotating rotor 24. The electric motor 18 is typically an induction type motor, and often a three-phase AC induction type motor. The stator 22 typically includes a plurality of coil windings and is fixedly mounted to the interior surface of the stator frame 20. The rotor 24 non-rotationally engages the protruding portion of the crankshaft 12 (i.e., is fixedly mounted with respect to the crankshaft 12) and is therefore encircled by the fixed stator 22. Typically, the rotor 24 is press fitted onto the crankshaft 12, and a protruding axial spline provided on the interior cylindrical surface of the rotor 24 engages a groove provided on the crankshaft 12.

An endnut 32 may engage a threaded portion 34 provided on the outboard distal end of the crankshaft 12 to axially retain the rotor 24 on the crankshaft 12.

The dimensional difference between the interior diameter of the stator 22 and the exterior diameter of the rotor 24 is relatively small, typically on the order of between about $40/1000$ and about $50/1000$ of an inch. If the rotor 24 is not maintained in a substantially central alignment with respect to the encircling stator 22, the rotor 24 may come into contact with the stator 22. Such rubbing degrades performance. In severe cases, contact of the rotor 24 with the stator 22 can short out the windings of the stator 22, thereby "burning out" the electric motor 18.

During startup of the electric motor 18, it has been discovered that a non-symmetric radial force is exerted on the rotor 24, and thus the crankshaft 12. Thus, during startup, forces are exerted on the rotor 24 which tend to "cant" the rotor 24 with respect to the stator 22. Over time in service, these forces can lead to the rubbing described above and, ultimately, can result in the above-described shorting and burning out of the electric motor 18.

There is disclosed in U.S. patent application Ser. No. 09/593,558, entitled "Locomotive Air Compressor with an Electric Motor Supported by an External Bearing" and in U.S. Ser. No. 09/593,559, entitled "Locomotive Air Compressor with Motor Supported by Outside Bearing" (both of these pending U.S. applications being assigned to the same assignee as the present application), various arrangements for providing what is herein referred to as a "third" or (alternatively) an "outboard" bearing. Such a third or outboard bearing provides additional support for the outboard distal end of the crankshaft 12, and considerably prevents (or at least substantially reduces) any canting of the crankshaft 12 and the rotor 24 attached thereto with respect to the stator 22.

There are an extremely high number of air compressors of the "3-CD" type in service. It is desirable, therefore, to provide an apparatus and method for "retrofitting" such in-service air compressors with such a third or outboard bearing. Such an apparatus and method are disclosed herein.

Since relatively tight tolerances are required in the alignment between the stator frame 20 (which ultimately determines the positioning of the stator 22) and the crankshaft 12 (which ultimately determines the positioning of the rotor 24), it has heretofore been the practice in the industry to carefully machine both the outwardly exposed face of the bearing plate 16 and the rearward face of the stator frame 20 (i.e., including the inwardly projecting lip 28 provided on the rearward face of the stator frame 20) to relatively exact dimensions, in order to ensure that the rotor 24 remains rather exactly centered with respect to the stator 22.

Such precise machining of the previously separate bearing plate 16 and stator frame 22 is an expensive procedure, and is not always entirely satisfactory in its implementation. A combined bearing plate and stator frame which eliminates the need for separate machining of the bearing plate and stator frame separately to the aforementioned tight tolerances required, and which provides for substantially increased precise alignment of the rotor 24 within the stator 22 over use in service, is disclosed herein.

OBJECTIVES OF THE INVENTION

Therefore, one objective of the invention is the provision of a combined bearing plate and stator frame which can be produced as an integrally formed component, thereby eliminating the previously employed steps of separately machining the bearing plate and the stator frame.

Another objective of the invention is the provision of a combined bearing plate and stator frame which can substantially reduce the failure rate due to rubbing and/or shorting out of the electric motor.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

In one aspect, the invention generally features a combined bearing plate and stator frame for an air compressor powered by an electric motor. The air compressor includes a crankshaft rotationally supported by a rotational bearing, and the electric motor includes a rotor and a stator substantially surrounding the rotor. The rotor is mounted on a portion of the crankshaft for rotation therewith. The combined bearing plate and stator frame is adapted for integration into the air compressor so as to provide a bearing plate for mounting of the rotational bearing and a stator frame for mounting of the stator therein and an aligning the stator with the rotor mounted on the portion of the crankshaft. The combined bearing plate and stator frame includes a bearing plate member and a stator frame member, the bearing plate member and the stator frame member being integrally formed from a single piece of material.

In another aspect, the invention generally features an improvement in an air compressor powered by an electric motor, the air compressor having a crankshaft rotationally supported by a rotational bearing and the electric motor being housed within a stator frame, the improvement including a combined bearing plate and stator frame for providing a bearing plate for mounting of the rotational bearing and a stator frame for housing and aligning the electric motor with the crankshaft. The combined bearing plate and stator frame includes a bearing plate member and a stator frame member, the bearing plate member and the stator frame member being integrally formed from a single piece of material.

In a further aspect, the invention generally features an air compressor powered by an electric motor and including at least one air compression cylinder having a piston mounted therein, a crankshaft for driving said piston in a reciprocal fashion within said at least one air compression cylinder, and a rotational bearing for positioning and supporting said crankshaft for rotational motion. The air compressor also includes an electric motor having a stator and a rotor, the rotor being mounted on the crankshaft of the air compressor and the stator surrounding the rotor. The air compressor further includes a combined bearing plate and stator frame for positioning and supporting the rotational bearing and for housing and aligning the stator with respect to said crankshaft. The combined bearing plate and stator frame includes a bearing plate member and a stator frame member, the bearing plate member and the stator frame member being integrally formed from a single piece of material.

DETAILED DESCRIPTION OF THE PREFERRED EMBODIMENTS OF THE INVENTION

Figures 3, 6:
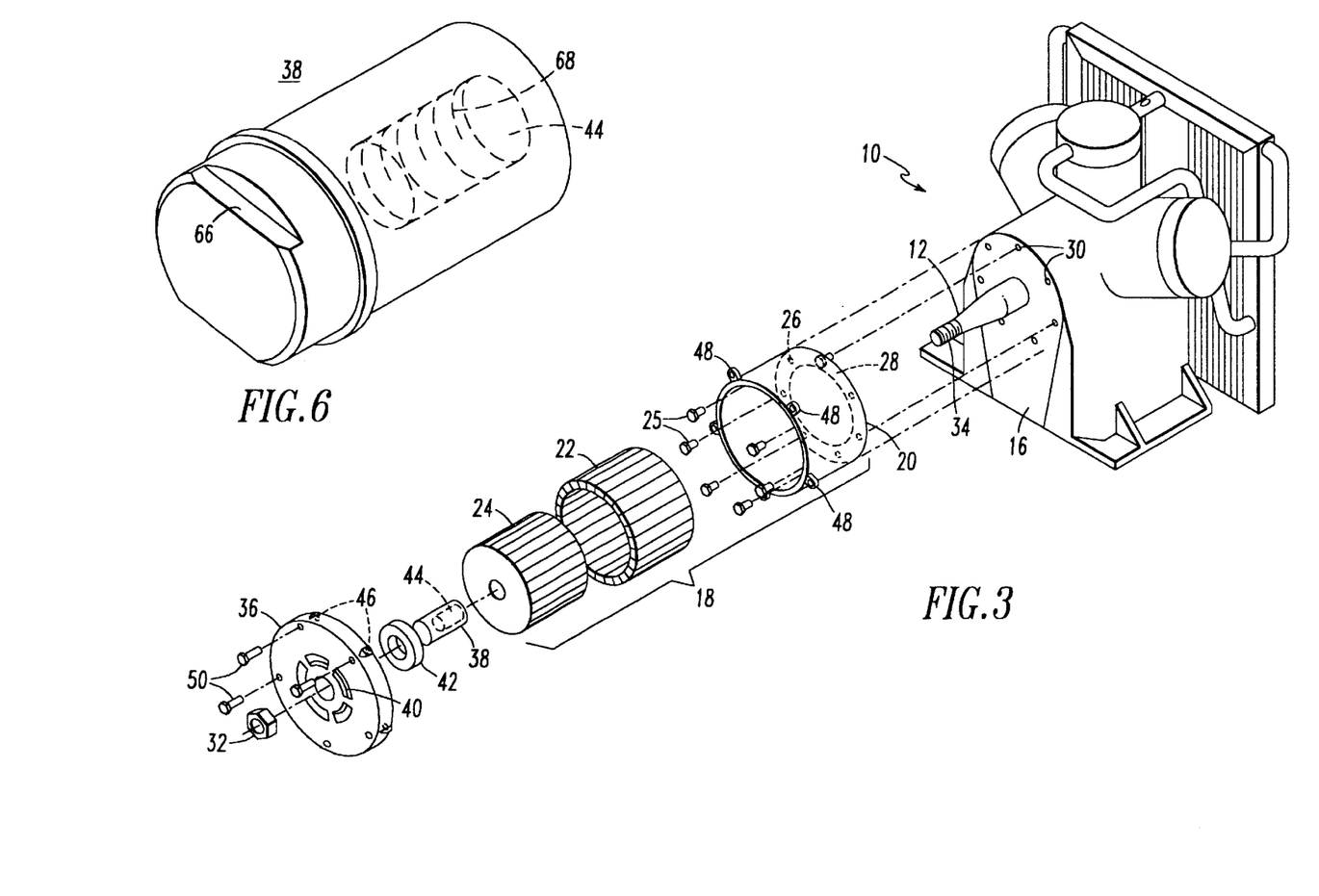
FIG. 3 is an isometric exploded view of a "3-CD" type air compressor equipped with an electric motor and provided with a third or outboard bearing.
FIG. 6 is an isometric view of a shaft extension.

Referring now to FIG. 3, an apparatus (or "kit") for retrofitting the air compressor 10 with a third or outboard bearing generally includes an endplate 36 and a shaft extension 38. The stator frame 20 is cantilevered from the exposed outboard face of the bearing plate 16 of the air compressor 10 through any suitable means. For example, the stator frame 20 may be secured to the bearing plate 16 through the use of the bolts 25 which pass through the holes 26 formed in the inwardly extending radial lip 28 formed on the rear (i.e., inward) face of the stator frame 20, the bolts 25 terminating in the threaded blind holes 30 formed in the bearing plate 16.

The endplate 36 includes a bearing housing 40, which provides a mounting for a third or outboard bearing 42. The stator 22 is fixedly mounted to the stator frame 20, and the rotor 24 is fixedly mounted to the crankshaft 12, for example, in the conventional manner as described above.

The shaft extension 38 is of general cylindrical shape and includes a threaded blind hole 44 which threads onto the distal end of the crankshaft 12. Thus, the shaft extension extends the crankshaft 12 to a length which is sufficient such that its distal end is rotationally mounted in and positioned by the third or outboard bearing 42.

The endplate 36 is provided with a series of throughgoing holes 46, and a corresponding series of lugs 48 are provided for attachment to the axially outward periphery of the stator frame 20. An equal series of bolts 50 pass through the holes 46 and threadingly engage the lugs 48, thereby securely positioning the endplate 36 with respect to the stator frame 20. Accordingly, the third or outboard bearing 42 is securely positioned with respect to the stator frame 20, and thence to the bearing plate 16.

The apparatus described immediately above with respect to FIG. 3, when attached to the arrangement shown in FIG. 2, by providing an outboard rotational bearing support for the distal end of the crankshaft 12, substantially reduces any tendency of the rotor 24 to become canted with respect to the stator 22.

Figure 4:
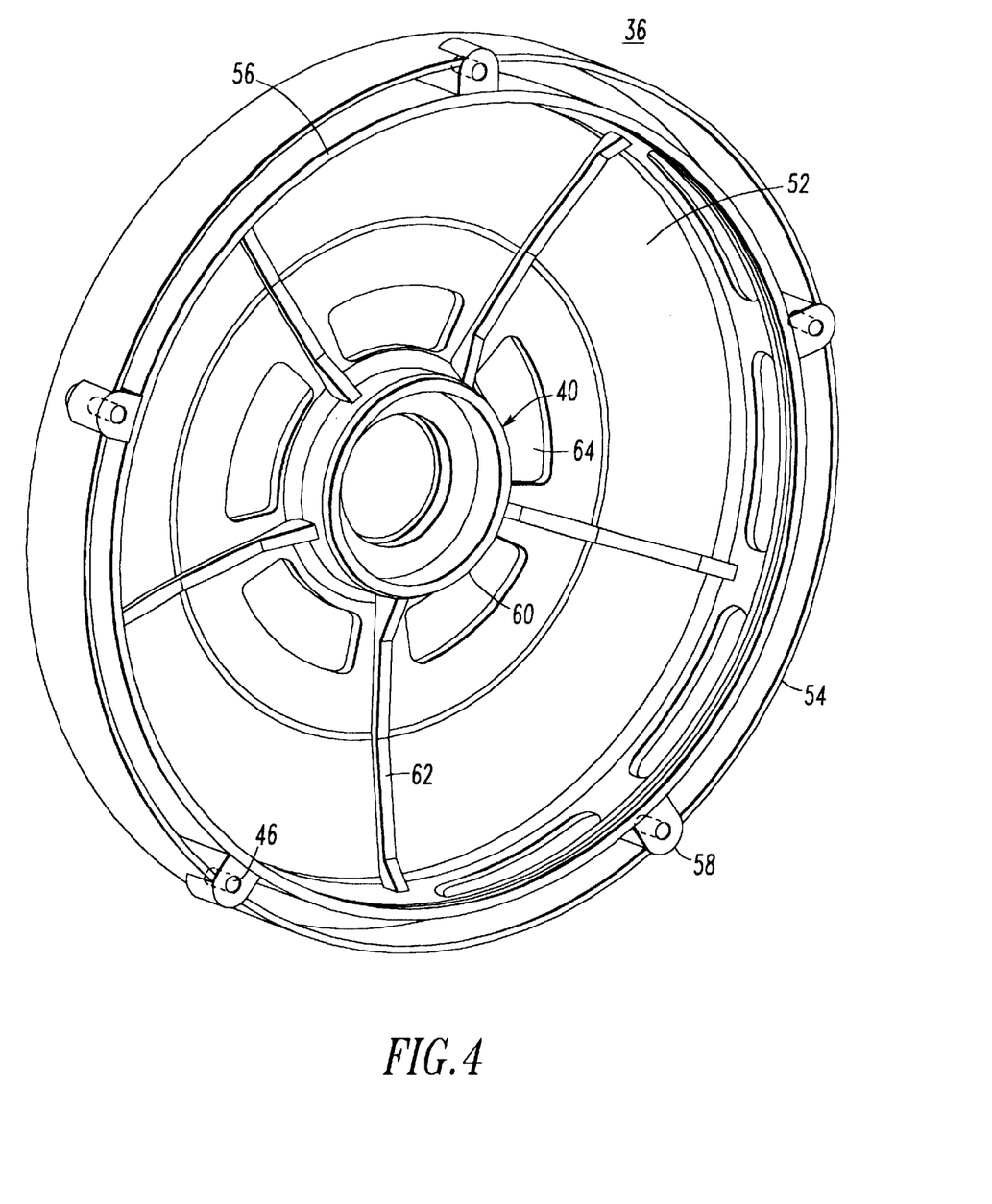
FIG. 4 is an isometric view of an endplate.
Figure 5:
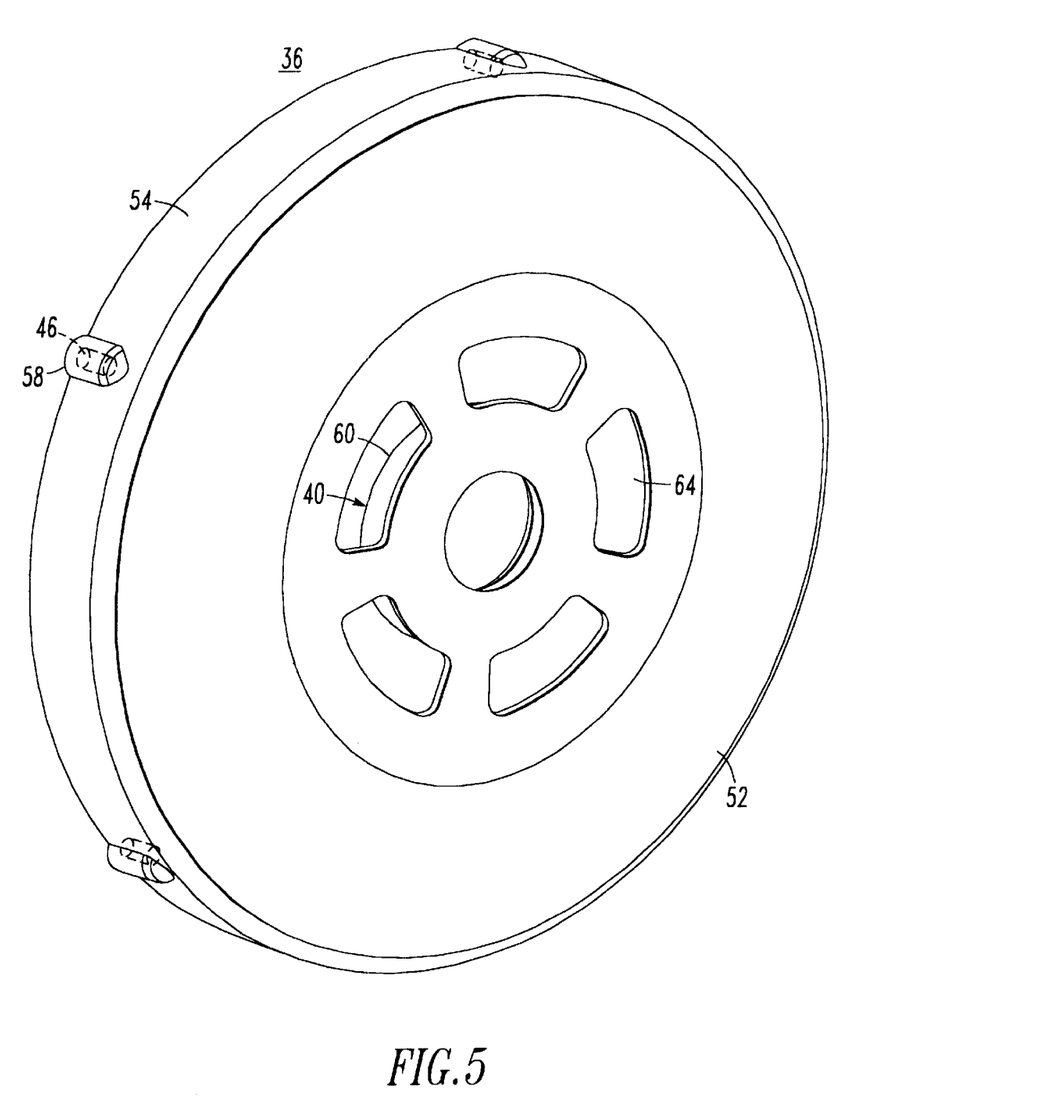
FIG. 5 is an isometric view of the endplate of FIG. 4, viewed from a reverse plane.

Referring now to FIGS. 4 and 5, the endplate 36, shown in more detail therein, generally includes a cap member, which is preferably provided in the form of disk-shaped portion 52, an outer rim 54 projecting axially from the periphery of the disk-shaped portion 52, and an inner flange 56, axially spaced inward from the outer rim 54. The inner flange 56 is appropriately machined so as to snugly mate with the axially outward edge of the stator frame 20. For example, a mating stepped surface may be machined into each of the corresponding surfaces. The throughgoing holes 46 are preferably provided in stanchions 58 located generally between the outer rim 54 and the inner flange 56. The bearing housing 40 is preferably provided in the form of an collar 60 projecting inwardly from the disk-shaped portion 52, which is preferably provided with reinforcing ribs 62 and ventilation openings 64.

Referring now to FIG. 6, the shaft extension 38 is generally cylindrical in form and is preferably provided with a tool engaging portion 66 (for example, in the form of opposing flats or a hexagonal head) to allow torque to be applied thereto for threading on/off the threaded portion 34 of the crankshaft 12. As noted above, the blind hole 44 is internally threaded, as through the provision of internal threads 68.

Figure 7:
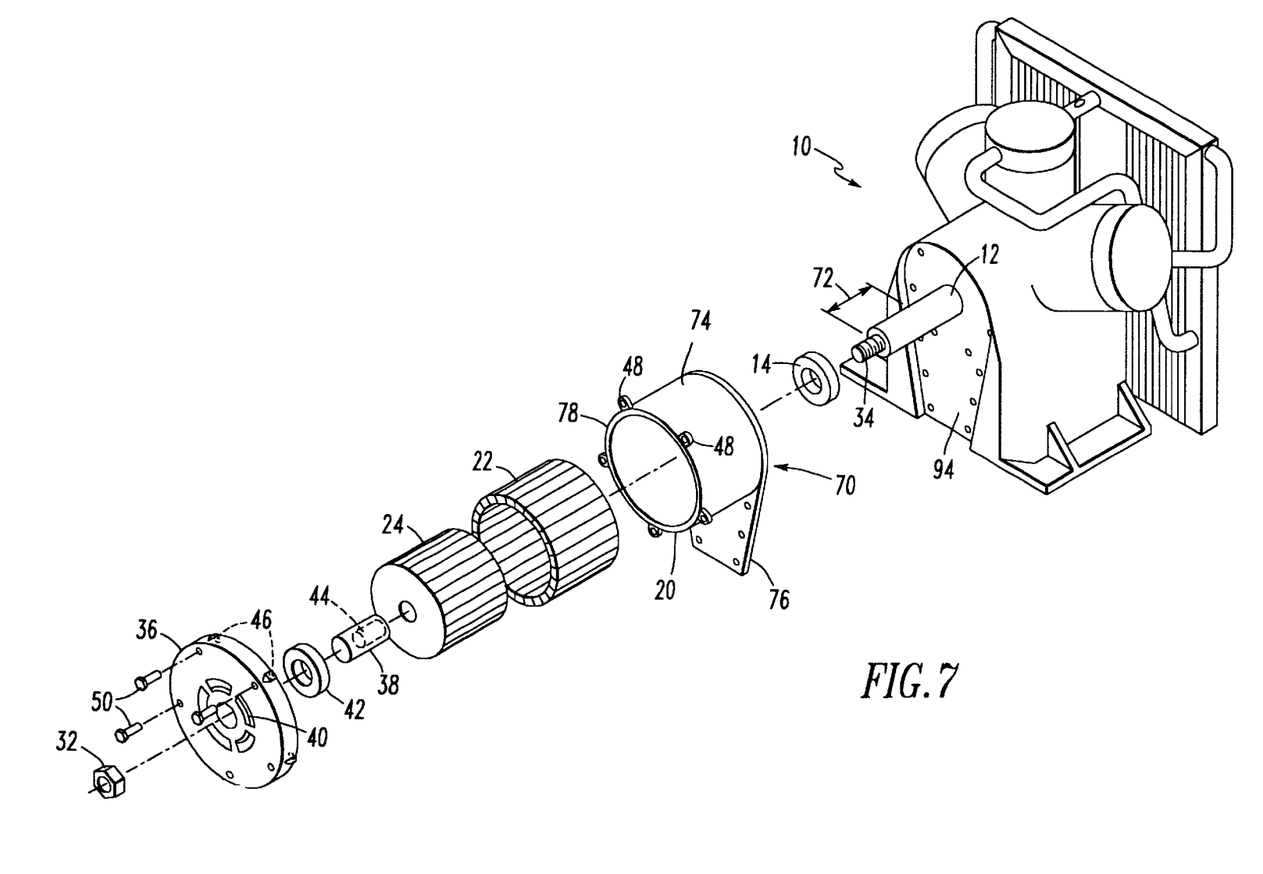
FIG. 7 is an isometric exploded view of a "3-CD" type air compressor having a combined bearing plate and stator frame, equipped with an electric motor, and provided with a third or outboard bearing.

FIG. 7 illustrates the use of a combined bearing plate and stator frame, generally designated by reference numeral 70, in the air compressor 10. While it is not a requirement that the combined bearing plate and stator frame 70 be used in combination with the endplate 36 and third or outboard bearing 42 in order to rotatingly support the distal end of the crankshaft 12, this is the preferred combination. However, the combined bearing plate and stator frame 70 could be used alone, and would still provide the advantage of not requiring that the bearing plate and stator frame be machined to the required tight tolerances separately.

When the combined bearing plate and stator frame 70 is employed, as shown by reference numeral 72 in FIG. 7, the crankshaft 12 is preferably provided with an additional extended length as compared to the length currently practiced in the industry. The crankshaft 12, which is usually produced as a single casting, is therefore preferably of an elongated length when using the combined bearing plate and stator frame 70. However, the combined bearing plate and stator frame 70 may still be used with a conventional length crankshaft 12, if, as shown optionally in FIG. 7, the shaft extension 38 shown most particularly in FIG. 6 is used to extend the length of the crankshaft 12.

Preferably, the combined bearing plate and stator frame 70 is produced as a single casting which is then machined to the required tolerances for connection to the air compressor 10 and for the attachment of the endplate 36 and other components thereto.

Figure 8:
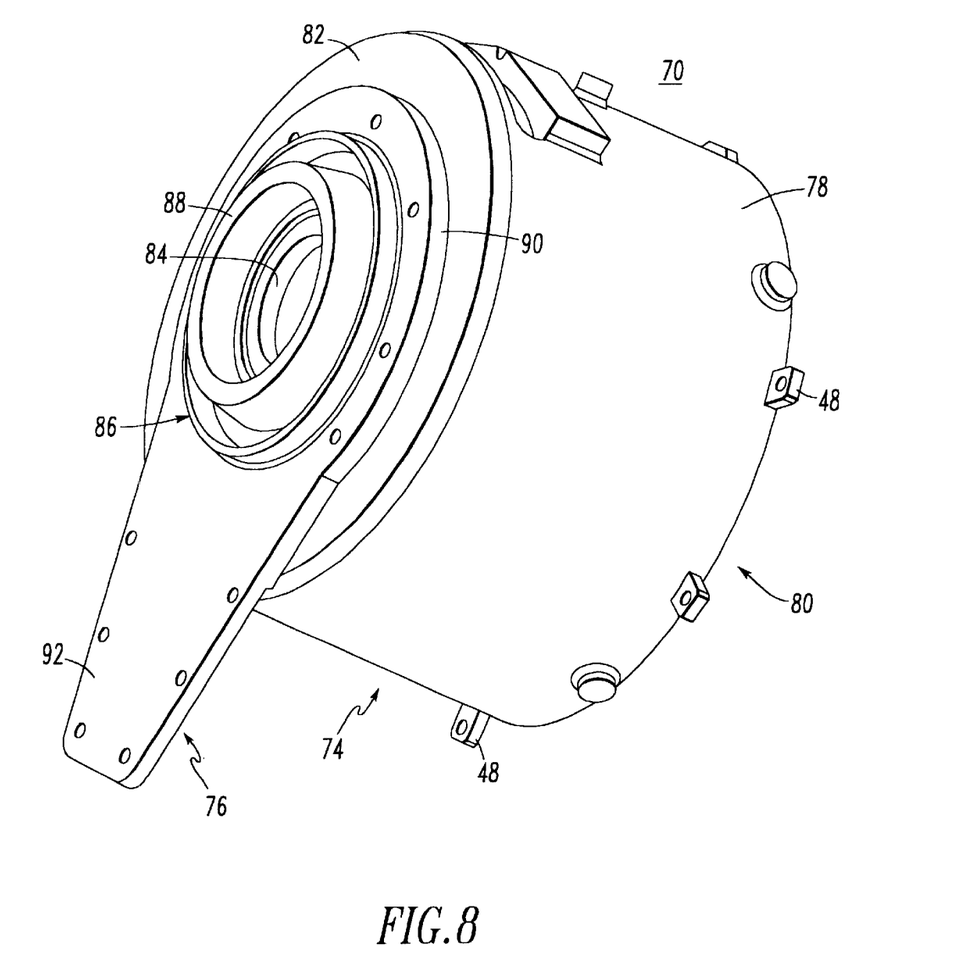
FIG. 8 is an isometric view of a combined bearing plate and stator frame.
Figure 9:
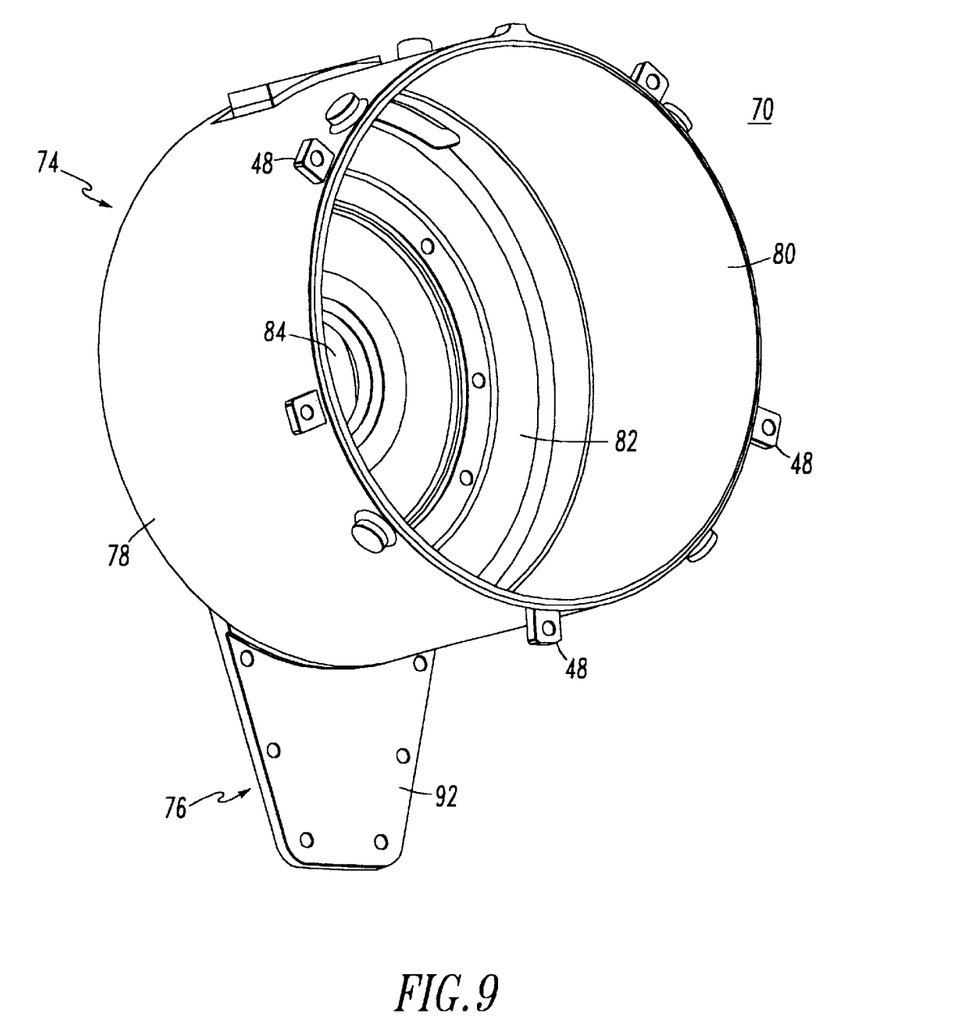
FIG. 9 is an isometric view of the combined bearing plate and stator frame of FIG. 8, viewed from a reverse plane.

Referring now most particularly to FIGS. 8 and 9, the combined bearing plate and stator frame 70 generally includes a cylindrical-shaped or bowl-shaped stator frame portion 74 and a bearing plate portion 76. The bowl-shaped stator frame portion 74 includes a cylindrical wall portion 78, one end of which 80 is open for receiving the stator 22, and an end wall 82, which partially encloses the other end of the cylindrical wall portion 78. The bearing plate portion 76 abuts, overlays, and is integrally formed with the end wall 82. An aperture 84 is formed in the end wall 82 and is encircled by a bearing receptacle 86, preferably provided in the form of an outstanding collar 88. The bearing plate portion 76 preferably includes a horseshoe-shaped portion 90, which surrounds both the aperture 84 and the bearing receptacle 86, and a wedge-shaped portion 92, which extends radially outward from the horseshoe-shaped portion 90.

The lugs 48 extend radially from the cylindrical wall portion 78 adjacent the open end 80, allowing the endplate 36 to be secured to the combined bearing plate and stator frame 70 through use of the bolts 50.

The combined bearing plate and stator frame 70 is dimensioned to be fitted into the open space shown by reference numeral 94 in FIG. 7, where a conventional bearing plate 16 of the air compressor 10 would be normally accommodated. The conventional inboard bearing 14 of the air compressor 10 is mounted in the bearing receptacle 86 formed on the inboard face of the combined bearing plate and stator frame 70.

While the present invention has been disclosed by way of a description of a particularly preferred embodiment or a number of particularly preferred embodiments, it will be readily apparent to those of ordinary skill in the art that various substitutions of equivalents can be effected without departing from either the spirit or scope of the invention as set forth in the appended claims.

What is claimed is:

1. A combined bearing plate and stator frame for an air compressor powered by an electric motor, such air compressor having a crankshaft rotationally supported by a rotational bearing and such electric motor including a rotor and a stator substantially surrounding such rotor, such rotor being mounted on a portion of such crankshaft for rotation therewith, said combined bearing plate and stator frame being adapted for integration into such air compressor so as to provide a bearing plate for mounting of such rotational bearing and a stator frame for mounting of such stator therein and aligning such stator with such rotor mounted on such portion of such crankshaft, said combined bearing plate and stator frame comprising:

a bearing plate member; and
   a stator frame member;
   said bearing plate member and said stator frame member being integrally formed from a single piece of material;
   said stator frame including a substantially bowl-shaped member;
   said substantially bowl-shaped member including a substantially closed wall portion, said wall portion having a first substantially open end and a second end at least partially closed by an end wall;
   an aperture formed in said end wall of said substantially bowl-shaped member; and
   said bearing plate member including a horseshoe-shaped portion at least partially encircling said aperture formed in said end wall and a wedge-shaped portion extending outward from said horseshoe-shaped portion.

2. A combined bearing plate and stator frame for an air compressor powered by an electric motor, according to claim 1, wherein:
   said bearing plate member and said stator frame member comprise a single casting.

3. A combined bearing plate and stator frame for an air compressor powered by an electric motor, according to claim 1, said combined bearing plate and stator frame additionally comprising at least one lug member disposed on said substantially bowl-shaped member.

4. A combined bearing plate and stator frame for an air compressor powered by an electric motor, according to claim 1, wherein said wall portion of said bowl-shaped member is substantially axially symmetric about a substantially central axis of said bowl-shaped member.

5. A combined bearing plate and stator frame for an air compressor powered by an electric motor, according to claim 4, wherein said bearing plate member lies in a plane which is disposed at a substantially right angle with respect to said substantially central axis of said bowl-shaped member.

6. A combined bearing plate and stator frame for an air compressor powered by an electric motor, according to claim 1, additionally comprising a bearing receptacle surrounding said aperture, said bearing receptacle being dimensioned to accept and position such rotational bearing of such air compressor.

7. A combined bearing plate and stator frame for an air compressor powered by an electric motor, according to claim 6, wherein said bearing receptacle comprises a collar portion outstanding from said end wall and substantially encircling said aperture.

8. A combined bearing plate and stator frame for an air compressor powered by an electric motor, according to claim 1, wherein said bearing plate member is integrally formed with and projects outward from said end wall of said bowl-shaped member.

9. In combination with an air compressor powered by an electric motor, said air compressor having a crankshaft rotationally supported by a rotational bearing and said electric motor being housed within a stator frame, the improvement comprising:

a combined bearing plate and stator frame for providing a bearing plate for mounting of said rotational bearing and a stator frame for housing and aligning said electric motor with said crankshaft;
   said combined bearing plate and stator frame comprising:
   a bearing plate member; and
   a stator frame member;
   said bearing plate member and said stator frame member being integrally formed from a single piece of material;
   said stator frame including a substantially bowl-shaped member;
   said substantially bowl-shaped member including a substantially closed wall portion, said wall portion having a first substantially open end and a second end at least partially closed by an end wall;
   an aperture formed in said end wall of said substantially bowl-shaped member; and
   said bearing plate member including a horseshoe-shaped portion at least partially encircling said aperture formed in said end wall and a wedge-shaped portion extending outward from said horseshoe-shaped portion.

10. The improvement in combination with an air compressor powered by an electric motor, according to claim 9, additionally comprising:
    at least one lug member disposed on said stator frame member;
    and wherein said bearing plate member and said stator frame member comprise a single casting.

11. The improvement in combination with an air compressor powered by an electric motor, according to claim 9, additionally comprising a bearing receptacle surrounding said aperture, said bearing receptacle being dimensioned to accept and position said rotational bearing of said air compressor.

12. An air compressor powered by an electric motor, comprising:
    at least one air compression cylinder including a piston mounted therein;
    a crankshaft for driving said piston in a reciprocal fashion within said at least one air compression cylinder;
    a rotational bearing for positioning and supporting said crankshaft for rotational motion;
    an electric motor including a stator and a rotor, said rotor being mounted on said crankshaft and said stator surrounding said rotor; and
    a combined bearing plate and stator frame for positioning and supporting said rotational bearing and for housing and aligning said stator with respect to said crankshaft;
    said combined bearing plate and stator frame comprising:
    a bearing plate member; and
    a stator frame member;

said bearing plate member and said stator frame member being integrally formed from a single piece of material;

said stator frame including a substantially bowl-shaped member;

said substantially bowl-shaped member including a substantially closed wall portion, said wall portion having a first substantially open end and a second end at least partially closed by an end wall;

an aperture formed in said end wall of said substantially bowl-shaped member; and said bearing plate member including a horseshoe-shaped portion at least partially encircling said aperture formed in said end wall and a wedge-shaped portion extending outward from said horseshoe-shaped portion.

13. An air compressor powered by an electric motor, according to claim 12, wherein said bearing plate member and said stator frame member comprise a single casting.

14. An air compressor powered by an electric motor, according to claim 12, additionally comprising a bearing receptacle surrounding said aperture, said bearing receptacle being dimensioned to accept and position said rotational bearing of said air compressor.

15. An air compressor powered by an electric motor, according to claim 12, additionally comprising at least one lug member provided on said stator frame member.

* * * * *